(12) United States Patent
Liu et al.

(10) Patent No.: US 8,719,889 B2
(45) Date of Patent: May 6, 2014

(54) LIVE TIME-SHIFT SYSTEM BASED ON P2P TECHNOLOGY AND METHOD THEREOF

(75) Inventors: Huaiyu Liu, Beijing (CN); Dingheng Ouyang, Beijing (CN)

(73) Assignee: Beijing TTKG Network Technology Co., Ltd., Beijing (CN)

( * ) Notice: Subject to any disclaimer, the term of this patent is extended or adjusted under 35 U.S.C. 154(b) by 469 days.

(21) Appl. No.: 13/043,641

(22) Filed: Mar. 9, 2011

(65) Prior Publication Data
US 2011/0231885 A1    Sep. 22, 2011

(30) Foreign Application Priority Data
Mar. 19, 2010   (CN) .......................... 2010 1 0127346

(51) Int. Cl.
*H04N 7/173* (2011.01)

(52) U.S. Cl.
USPC ........... 725/115; 709/201; 709/202; 709/203; 707/622; 707/827

(58) Field of Classification Search
USPC .......... 725/51, 54, 62–73, 86–105, 114–115, 725/118, 133, 135, 138–141, 143–145, 725/153; 709/201–203; 707/622, 827
See application file for complete search history.

(56) References Cited

U.S. PATENT DOCUMENTS

| | | | | |
|---|---|---|---|---|
| 6,014,706 A * | 1/2000 | Cannon et al. | ................ | 709/231 |
| 6,799,199 B1 * | 9/2004 | Segal et al. | .................... | 709/207 |
| 6,804,300 B1 * | 10/2004 | Hoshino et al. | ............ | 375/240.1 |
| 8,260,947 B2 * | 9/2012 | Mine et al. | .................... | 709/231 |
| 8,307,024 B2 * | 11/2012 | Setton et al. | .................. | 709/200 |
| 8,332,472 B2 * | 12/2012 | Tian et al. | ..................... | 709/204 |
| 2002/0016970 A1 * | 2/2002 | Negishi et al. | .................. | 725/88 |
| 2002/0124262 A1 * | 9/2002 | Basso et al. | .................... | 725/109 |
| 2002/0174438 A1 * | 11/2002 | Cleary et al. | .................. | 725/100 |
| 2007/0130597 A1 | 6/2007 | Parker et al. | .................... | 725/94 |
| 2008/0133767 A1 * | 6/2008 | Birrer et al. | .................... | 709/231 |
| 2009/0113253 A1 * | 4/2009 | Wang et al. | ..................... | 714/48 |
| 2009/0116640 A1 * | 5/2009 | Noh et al. | ....................... | 380/29 |
| 2009/0119734 A1 * | 5/2009 | Deshpande et al. | .......... | 725/118 |
| 2009/0240833 A1 * | 9/2009 | Zhang | ............................ | 709/236 |
| 2009/0300673 A1 * | 12/2009 | Bachet et al. | ................... | 725/31 |
| 2010/0268777 A1 * | 10/2010 | Tian et al. | ..................... | 709/204 |
| 2011/0060798 A1 * | 3/2011 | Cho et al. | ....................... | 709/206 |

FOREIGN PATENT DOCUMENTS

| | | |
|---|---|---|
| CN | 101075954 A | 11/2007 |
| CN | 101207795 A | 6/2008 |

* cited by examiner

*Primary Examiner* — Yassin Alata
(74) *Attorney, Agent, or Firm* — Ohlandt, Greeley, Ruggiero & Perle, LLP

(57) ABSTRACT

The present invention provides a live time-shift system based on the P2P technology and a method thereof. The system includes a coding server, a live server and a control server arranged at a server end. The method includes: splitting, by the coding server, a received live video data stream into fixed-size live video packets; and then adding live channel information and time information to each of the live video packets; issuing the coded live video packets to the live server, and sending current control information to the control server; continuously obtaining, by the live server, the live video packets from the coding server; upon requesting viewing of the video data, first sending, by the client, a video request to the control server; returning, by the control server, storage information of the video data to the client, and obtaining, by the client, the video data through an established data link. Both of the server and the client of the present invention support the live time-shift function based on the P2P technology, which may support mass parallel applications.

2 Claims, 1 Drawing Sheet

LIVE TIME-SHIFT SYSTEM BASED ON P2P TECHNOLOGY AND METHOD THEREOF

FIELD OF THE INVENTION

The present invention belongs to the field of network video transmission and application technology, and particularly relates to a video transmission technology combining the P2P technology and the live time-shift technology.

BACKGROUND OF THE INVENTION

The live video technology has been widely used and the TV belongs to such technology. The live video technology is characterized by the timeliness, that is, the live video content can not be viewed if the time is missed. For a client who wants to view the live video content but his/her time can not be guaranteed, he/she either waits for the re-broadcast of the video content or views the video content by the way of on demand. However, it is uncertain whether the live video content will be re-broadcasted, whether the live video content will become the video content on demand and when the video content on demand is put on the line. For satisfying the clients, the technology of storing the live video content appears. Such storage may be realized on a server or by a storage device at the client.

The realization at the client refers to that a storage device is configured at the client and the client sets information of channels to be stored, the start time and the end time of the storage or the like, on the basis of his/her favor. This method has some disadvantages in that the capacity of the storage device at the client is limited, thus only a certain amount of video content can be stored, and generally, the storage device stores only the live video content for one channel at each time period. If the client needs to store the live video content for multiple channels, or needs to store the live video content for a long time period, the storage device at the client can not satisfy this requirement. Additionally, the most important problem of this method lies in that the client is required to set recording channel and time for a program in advance according to a program schedule. For an event that happens unexpectedly without a program schedule, the storage information can not be set and the storage can not be performed because the client does not know the start time of the live video content.

The realization at the server end refers to that a storage device is configured on the server for storing live video content for all channels. If the user needs the live video content of a channel prior to the current time, the client sends to the server a request including channel information and information of the start time of the live video data, for example, the current time is 12:00, Dec. 15, 2009, and a client requests viewing of the live video data of channel A with a start time is 11:00:35, Dec. 1, 2009, the server searches for the storage position of the live video content of channel A with a start time is 11:00:35, Dec. 1, 2009 on receiving the request from the client, and obtains the live video data from the storage position of the live video content and sends the live video data to the client. It seems like the live video content after time-shift is viewed by the client, which is referred to as live time-shift technology.

Because the storage capability of the server is very high, that is, the server can store all live video content for all live channels, which can meet the requirement of clients to view the live video content that is not specific.

To distinguish from the live video, the live video after time-shift is referred to as live time-shift video hereinafter.

The live time-shift technology using the server for storage has been relatively mature, a Chinese patent (publication number: CN 101207795A, abbreviated as reference patent 1) titled "live server with time-shift function and implementing method thereof" discloses a representative live time-shift technology using a server for storage. In this patent, the live server is modified to add a storage function, thus the live server can also be used as a time-shift server. During the storage, upon receiving live video sources, the modified live server issues live video data while storing live video data, and adds video attributes and time information to the stored live video data. In this way, live time-shift video service can be provided to clients according to the index of channel and time information.

In published documents, the live time-shift technology (including the technology of the reference patent 1) performs the transmission of live video content in the manner of unicast. The unicast means that a data channel is established between each client and the server, thus the number of occupation of server resources is linearly correlated with the number of the clients. If the number of the clients increases sharply, the server resources increase linearly, thus it is going against mass application of the unicast.

At present, the P2P technology is widely used in the video transmission service, a Chinese patent (publication number: CN 101075954A, abbreviated as reference patent 2) titled "point-to-point streaming media communication system and method for configuring resources in super node thereof" is a much representative P2P video transmission technology. In the reference patent 2, a method for realizing streaming media transmission system based on the P2P technology is described. Such technology may be used in an on-demand service and a live service.

In published documents about the P2P live technology, the value of time length of the memory buffer in the server is typically in the order of second (generally within 150 s). Because the length of the memory buffer affects the time delay for displaying the live video on the client terminal, the increasing of the time delay will affect the visual effect of the client.

SUMMARY OF THE INVENTION

An object of the present invention is to overcome the disadvantages in the existing live time-shift technology. It is provided a live time-shift system based on the P2P technology and a method thereof, which enables both of the server and the client to support the live time-shift function based on the P2P technology by modifying the server and the client to add the P2P mechanism, and which may support mass concurrent applications.

The live time-shift system based on the P2P technology according to the present invention includes a coding server, a live server and a control server arranged at a server end, wherein the coding server is adapted to receive a passed live video data stream from a live signal source, to split the live video data stream into fixed-size live video packets, and to add a channel number and time information to each of the live video packets;

the live server is adapted to live-broadcast and store live video packets of a channel and to simultaneously provide a plurality of clients with live video or live time-shift video;

the control server is adapted to process a video request from a client and to provide the client with storage information of video data; the control server is provided with a live information list, a live time-shift information list and a program schedule for each live channel; wherein the live information list includes a live channel, a server currently live-broadcasting the live channel and a list of information of clients currently viewing the live channel; when the client stops viewing the live video, the control server removes the record of the client from the live information list; the live time-shift information list includes a live channel, a live server having stored video data of the live channel and a list of information of the clients; as long as the live server or the clients store video data, the control server holds the record of the live server or the client in the live time-shift information list.

The present invention further provides a live time-shift method based on the P2P technology including:

1) receiving, by a coding server at a server end, a live video data stream from a live video data source, first splitting the live video data stream into fixed-size live video packets, and then adding live channel information and time information to each of the live video packets;

issuing, by the coding server, the coded live video packets to a live server, and sending to a control server the live channel that is being currently coded, the live server currently receiving the live video packets and control information of coding restart or coding failure;

2) establishing a memory buffer in the live server at the server end, and setting the memory buffer at the server end to have a size capable of storing fixed-time length live video packets; continuously obtaining, by the live server, the live video packets from the coding server, and writing the live video packets into the memory buffer at the server end; when the memory buffer of the live server is full, the earliest live video packet being discarded, and the memory buffer that has been vacated being adapted to receive the latest live video packet;

establishing a disc storage space in the live server; writing, by the live server, the live video packets in the memory buffer at the server end into the disc storage space at a specified time interval; and before writing the live video packets into the disc buffer, removing the live channel information and the time information of each of the individual live video packets, combining all the live video packets written in the disc storage space in one time interval into a live video data file; setting the channel information and the time information of the live video data file as a file name of the video data file, and submitting the channel information and the time information of the video data file to the control server; wherein the channel information and the time information is unique identification information for the video data file;

providing, by the live server, a P2P live service using the live video packets in the memory buffer, or providing a live time-shift service within the range of time length of the memory buffer of the live server using the live video packets in the memory buffer at the server end, or providing a live time-shift service with a time length exceeds that of the memory buffer of the live server using the live video content stored in the disc storage space;

3) when a client requests viewing of the video data, first sending, by the client, a video request to the control server at the server end, the video request including channel information and time information; returning, by the control server, storage information of the video data to the client according to the start time of the video requested by the client and the size of the memory buffer of the live server; establishing, by the client, a data link between the client and the live server or other clients according to the storage information; and obtaining the video data through the established data link.

The technical characteristics and beneficial effects of the present invention includes:

The present invention is realized at the server end, which enables both of the server end and client to support the live time-shift function based on the P2P technology by modifying the server end and the client and adding the P2P mechanism to the server end, and which may support mass parallel applications.

In the present invention, the coding server is modified, that is, a data splitting program is added to the coding server. The live video content is sent from a signal source to the coding server in the manner of data stream, the coding server splits the live video data stream into fixed-size video packets, and adds header information to each packet, the information including channel number, time information, etc. The coding server sends the coded live video packets to the live server in time sequence.

In the present invention, the live server is modified, that is, a storage space is added on the live server. While live-broadcasting the video data, the live server stores the live video content into the storage space of the live server. The present invention modifies the size of the buffer of the live server. In storing, the header information of each live video packet is removed firstly, then the live video data stored in a long time period is combined into a video file, and the video file is named using the channel number and time information.

In the present invention, the client is modified, that is, a memory buffer and a disc buffer are set in the client. When receiving the live video data, the client writes the live video data into the memory buffer and the disc buffer of the client respectively. A disc storage space is preserved on the client. When the client views the live video content or live time-shift video content, the received video data will be stored into the disc storage space, and the client automatically reports the storage situation of the video content (whether the live video data or the live time-shift video data), thus the client may support not only the P2P live service but also the P2P live time-shift service.

There are some essential differences between the live time-shift method based on the P2P technology according to the present invention and the existing on-demand method and the live method based on the P2P technology described in reference patent 2. The basis of the present invention is the P2P based live technology. Also, a storage function is added to the server and the client on the basis of the P2P based live technology, and thus the P2P based live time-shift technology can be provided. The present invention also adopts the P2P based on-demand technology, but such on-demand technology is applied to the live time-shift technology.

The present invention applies the P2P technology to the server live time-shift technology. In the P2P technology, the spare resource of the on-line client is used for providing the video transmission service for a new on-line user, which may reduce the occupation of the server resource and satisfy the requirement of supporting mass parallel applications by the server live time-shift technology.

DETAILED DESCRIPTION OF THE INVENTION

Figure 1:
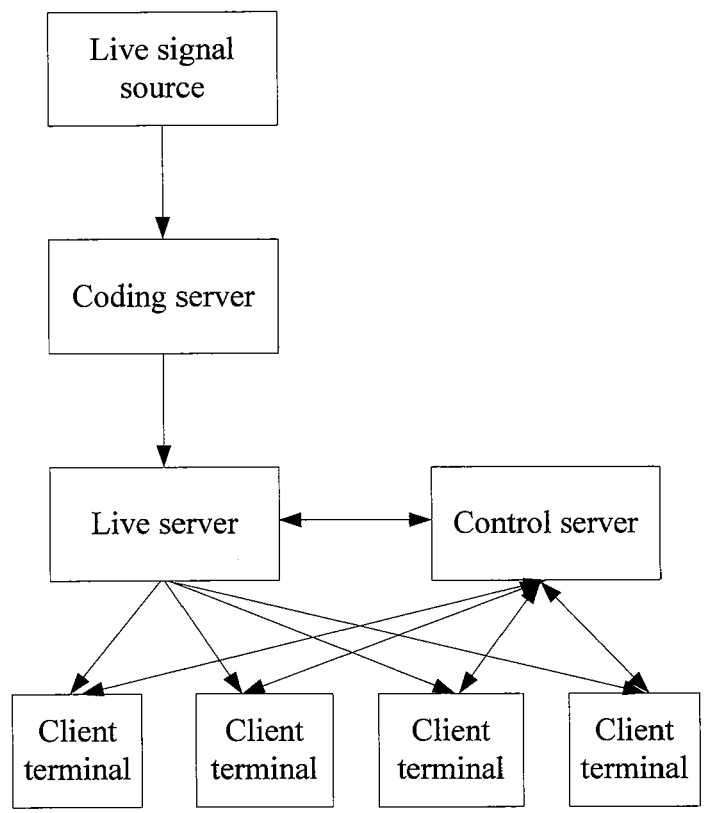
FIG. 1 is a structural block diagram of a system according to the present invention.

The live time-shift system based on the P2P technology and the method thereof according to the present invention are described as follows in detail with reference to the drawings and embodiments.

As shown in FIG. 1, the live time-shift system based on the P2P technology according to the present invention includes a coding server, a live server and a control server that are arranged at a server end. The coding server is adapted to receive passed live video data stream from a live signal source, to split the live video data stream into fixed-size live video packets (for example, live video packets with the size of 360 KByte), and to add a channel number and time information to each of the live video packets.

The live server is adapted to live-broadcast and store live video packets of a channel and to simultaneously provide live video to multiple clients or provide live time-shift video.

The control server is adapted to process a video request from a client and provide the client with storage information of video data. The control server is provided with a live information list, a live time-shift information list and a program schedule for each live channel. The live information list includes an information list of a live channel, a server currently live-broadcasting the live channel and a client currently viewing the live channel. When the client stops viewing the live video, the control server removes the record of the client from the live information list. The live time-shift information list includes an information list of the live channel, the live server having stored video data of the live channel and the clients; as long as there is video data stored in the live server or the clients, the control server holds the record of the live server or the clients in the live time-shift information list.

A live time-shift method based on the P2P technology according to the present invention includes the steps as follows.

1) A coding server at a server end receives live video data stream from a live video data source. First, the coding server splits the live video data stream into live video fixed-size packets (for example, packets with a size of 360K, and the value of the packets is an empirical value selected from the value of the bandwidth for broadband users), and then adds live channel information and time information to each of the live video packets (a live channel ID is a unique identifier of a channel and may not be used repeatedly; the time information may be a current absolute time (for example, 9:45:23:21, Dec. 15, 2009), or may be a relative time (the embodiment uses an absolute time to mark the time information, and whether the absolute time or the relative time is used, the two kinds of time information can be converted from each other by performing a simple conversion); in addition, the precision of the time may be determined from the length represented by the packet (for example, in the order of second or in the order of millisecond);

(In the present invention, the live video data stream is split into small packets. In this way, on one hand, it is advantageous for the transmission of the live video data using the P2P protocol, and on the other hand, because each of the live video packets carries the channel information and time information and the time information is in the order of second, it is convenient for the user at the client to perform drawing, pausing, etc., like the video display, through an operation on the display progress bar).

The coding server distributes the coded live video packets to the live server and sends to the control server the live channel that is being coded currently, the live server currently receiving the live video packets and control information of coding restart or coding failure, etc.

2) A memory buffer is established in the live server at the server end, and the memory buffer at the server end is set to have a size capable of storing live video packets with a fixed time period (which may be set as 60 minutes in this embodiment, and in this case, the value of the memory buffer at the server end=60 min*60 s*video code stream. The value of the size of memory buffer at the server end is an empirical value selected according to the performance of the live server, the performance of the disc storage space of the live server and the value of the bandwidths of broadband users). The live server continuously obtains the live video packets from the coding server and writes the live video packets into the memory buffer at the server end. If the memory buffer of the live server is full, the earliest live video packets are discarded, and the memory buffer that is vacated is used to receive the latest live video packets (that is, the memory buffer at the server end is managed in a principle of First-In First-Out (FIFO)).

A disc storage space is also established in the live server. The live server writes the live video packets placed in the memory buffer at the server end into the disc storage space in a specified time interval (in this embodiment, for example, the memory buffer at the server end has a size capable of storing the live video packets for 60 minutes, the time interval for writing the disc storage space is set as 60 minutes). Before writing into the disc buffer, the live channel information and time information of each of the individual live video packets is removed and all the live video packets written into the disc storage space in one time interval are combined to a live video data file (in this embodiment, for example, the live video packets of 60 minutes are combined to a live video data file with a time length of 60 minutes). The channel information and the time information (any one time point among the start, end and middle of the live video data file may be selected, the start time point is selected as the time information in this embodiment) of the live video data file are set as a file name of the video data file (for example, a video file of the CCTV1 on 18:00, Dec. 2, 2009 may be named as CCTV1T2009120218). The channel information and the time information of the video file are submitted to the control server. The channel information and the time information are the unique identification information for the video file (the disc storage space of the server is large enough to store all of the live video contents in principle).

The live server provides the P2P live service using the live video packets in the memory buffer, or provides the live time-shift service within the range of time length of the memory buffer in the live server (within 60 minutes) using the live video packets in the memory buffer at the server end, or provides the live time-shift service which exceeds the time length of the memory buffer of the live server (for example, more than 60 minutes) using the live video content stored on the disc storage space (either memory or disc).

3) Upon requesting viewing of video data, the client first sends a video request to the control server at the server end, the video request including the channel information and the time information (the default time in the video request is the current time; alternatively, the start time of displaying the live video stream may be set as the time information by the client). The control server returns the storage information of the video data to the client according to the start time of the video requested by the client and the size of the memory buffer in the live server, the client establishes a data link between itself and the live server or other clients according to the storage information, and receives the video data through the established data link.

Particularly, the above operation includes the following three situations:

Situation (1): The start time of displaying the live video requested by the client is the current time.

First, the control server calculates a difference between the current time and the start time of the live video requested by the user. If the difference is 0, the request from the client is a live video request, and the control server queries the live information list and sends to the client a list of the live server currently issuing the live channel and address information of other clients currently viewing the live channel. The client establishes data links between itself and the live server in the list as well as between itself and the other clients currently receiving the live video packets in the list to receive the live video packets.

In the client, a memory buffer, a disc buffer and a comparison table (in this embodiment, the value of the time length of the memory buffer in the client is 150 s, and the value of the disc buffer is 1 GB (GB=1000000000 byte, the "byte" is "字节" in Chinese and it is a commonly-used word in the field of computer, and the value is an empirical value selected according to the value of the average residual disc space of a large amount of users) are established. When receiving the live video packets, the client puts the live video packets into the memory buffer of the client while writing the live video packets into the disc buffer (both the memory buffer and the disc buffer of the client use the principle of FIFO). After each of the live video packets is written into the disc buffer, the client adds a record in the comparison table for recording channel information, time information and storage information in the disc buffer of the live video packet.

When the client writes the live video packets into the disc buffer in a naming rule as the same as that in which the live server stores the live video data, and a sequence number is added at the end, for example, for a first live video packet of the CCTV1 which begins from 18:00, Dec. 2, 2009, the corresponding storage file may be named as CCTV1T2009120218000001, and a second live video packet may be named as CCTV1T2009120218000002 and the like.

When writing the live video packets into the disc buffer, the client verifies each of the live video files and puts a verification result behind the live video file. When another client receives a live video data file from the client, if a verification result is different from that of the live video file (it indicates that the live video data is modified), the live video file is discarded (such operation is performed for ensuring the live video file not to be modified and guaranteeing the security of the live video data transmission).

The client submits to the control server the storage situation after the live video data file is written into the disc buffer.

When stopping viewing the live video, the client interrupts all data transmission links for the live video packets, deletes the live video packets in the memory buffer of the client and deletes the comparison table.

Situation (2): The start time of displaying the live video requested by the client is earlier than current time and later than a time which is obtained by subtracting the value of the time length of the memory buffer in the live server (such as 60 minutes) from the current time:

The control server first calculates a difference between the current time and the start time of displaying the live video requested by the client. If the start time of displaying the requested live video is earlier than the current time and later than a time which is obtained by subtracting the value of the time length of the memory buffer in the live server from the current time, for example, the start time of displaying the live video requested by the user is 17:01:45, Dec. 11, 2009, the current time is 17:25:40, Dec. 11, 2009, the time obtained by subtracting the value of the time length of the memory buffer in the live server from the current time is 16:25:40, Dec. 11, 2009, thus the start time of displaying the live video requested by the user 17:01:45, Dec. 11, 2009 is earlier than the current time and later than the time 16:25:40, Dec. 11, 2009 which is obtained by subtracting the value of the time length of the memory buffer in the live server from the current time, then the control server determines that the request is a live time-shift video request within the range of the memory buffer of the live server. The live video packets requested by the client exist in the memory buffer of the live server and the live video packets have been stored in other client terminals currently viewing the same channel. The control server queries the live information list, and then sends to the client connection information of the live server that is currently live-broadcasting the channel and other clients currently viewing the live channel. The client establishes data links between itself and the above server as well as between itself and other clients, and obtains live time-shift video packets with a shift time is less than the value of the time length of the memory buffer in the live server.

When viewing the live time-shift video of which the shift time is less than the value of the time length of the memory buffer in the live server, the client establishes a memory buffer, a disc buffer and a comparison table. The operation principle of the memory buffer, the disc buffer and the comparison table in the client is the same as that in the client described in situation (1), with the exception that the live time-shift video viewed by the client has a time difference from the live video viewed by the client in situation (1). During viewing of the live time-shift video, the client implements file storage, file verification and report of stored information as the client in situation (1).

(3) The start time of displaying the live video requested by the client is earlier than a time which is obtained by subtracting the value of the memory buffer in the live server (such as 60 minutes) from the current time.

The control server calculates a difference between the current time and the start time of displaying the live video requested by the user. If the start time of displaying the requested live video is earlier than a time which is obtained by subtracting the value of the time length of the memory buffer in the live server from the current time, for example, the start time of displaying the live video requested by the client is 17:30:45, Dec. 10, 2009, the current time is 17:25:40, Dec. 11, 2009, and the time obtained by subtracting the value of the time length of the memory buffer in the live server (60 minutes) from the current time is 16:25:40, Dec. 11, 2009, thus the start time of displaying the live video requested by the client 17:30:45, Dec. 10, 2009 is earlier than the time obtained by subtracting the value of the time length of the memory buffer in the live server from the current time 16:25:40, Dec. 11, 2009, then the control server determines that the request is a live time-shift video request out of the range of the memory buffer of the live server. The live video packets requested by the client only exist in the disc storage area of the live server and the disc buffer of other client terminals that have stored the live video files. The control server queries the live time-shift information list, and then sends to the client connection information of the live server and other clients that have stored the live video files. The client establishes data links between itself and the above server as well as between itself and other clients, and obtains live time-shift video packets with a shift time longer than the value of the time length of the memory buffer in the live server.

When viewing the live time-shift video with the shift time longer than the value of the time length of the memory buffer in the live server, the client establishes a memory buffer and a disc buffer. The operation principle of the memory buffer and the disc buffer of the client is the same as that in the client described in situation (1), with the exceptions that the live time-shift video, viewed by the client, has a shift time longer than the value of the time length of the memory buffer in the live server and the live video data is transmitted in a manner of live video file but not in a manner of live video packet. During viewing of the live time-shift video, the client implements file storage, file verification and report of stored information as the client in situation (1).

The client downloads corresponding live video files in the manner of file and stores the live video files into the disc buffer while displaying the live video files. When the client stops viewing the live time-shift video, the client submits the storage information to the control server.

The situation (3) is similar to the P2P on-demand technology. However, in the present invention what the client views is a temporal live video stream which is obtained by time-shifting the live video, which is the basic difference between the present invention and the P2P on-demand technology.

The present invention provides a live time-shift system based on the P2P technology and a method thereof according to embodiments. The system includes a coding server, a live server and a control server which are arranged at the server end. The method includes the following steps.

1) A coding server receives a live video data stream from a live source, splits the live video data stream into live video packets with the size of 360K, adds channel information and time information to each of the live video packets, and then sends the live video packets to a live server in time sequence.

2) A memory buffer capable of storing the live video packets for 60 minutes is built in the live server. The size of memory buffer is calculated as follows. Assuming that the live video code stream is 400 Kbits, i.e., 400 Kbit/s, the time length 60 min=3600 s, the value of the memory buffer=60 min*60 s*400K/8, where the dividing by 8 is performed due to the fact that the unit of the calculated data is bit and generally the live video packets are stored in the unit of byte, 1 byte=8 bits. The video code stream live server receives the live video packets from the coding server, puts the live video packets into the memory buffer in time sequence, and combines and stores the live video packets of the memory buffer into the disc space at a time interval of 60 minutes. The memory buffer of the live server adopts the principle of FIFO. When the memory buffer of the live server is full, the earliest live video packet is dropped, and the memory buffer of the live server that has been vacated is used to store the latest live video packet. The memory buffer of the live server can store the live video packets for 60 minutes, and therefore, every 60 minutes, there is no repetition between the live video packets in the memory buffer of the live server and that of the previous 60 minutes. At the end of each 60 minutes, the live server deletes the channel information and time information of the live video packets in the memory buffer, combines all the live video packets in the memory buffer of the live server into a live video file in time sequence, and uses the live channel information and time information to name the live video file, for example, CCTV1T2009122018 which denotes a live video file of the CCTV1 on 18:00, Dec. 20, 2009. The storage resource of the server is very large, which therefore in principle can store all the live video contents of all channels.

The live server submits channel information for current live-broadcasting and the stored live file information to the control server.

When the client wants to view a live video, the client sends a live video request to the control end. In the present system, the client may select a live video at a certain time point to view according to the requirement of the client. The selected time point may be a current time or a time point prior to the current time.

The live video request sent by the client includes channel information and time information of the live video.

(1) Upon receiving the live video request sent by the client, the control server first calculates a difference between the current time and the start time of the live video requested by the client. If the difference is 0, the request from the client is a live video request, the control server queries the live information list and sends to the client a list of a live server currently issuing the live channel and address information of other clients currently viewing the live channel. The client establishes data links between itself and the live server in the list as well as between itself and other clients currently receiving the live video packets, for receiving the live video packets. The processes of query and issuing of the live data performed by the live server are similar to that of the disclosed P2P live technology, with a difference that the start time of the live video request by the client may be the current time or a time point prior to the current time.

Before receiving of the live video packets, the client establishes a memory buffer, a disc buffer and a comparison table. The value of the time length of the memory buffer of the client is 150 s. Assuming that the live video code stream is 400 Kbits, the capacity of the memory buffer=length 150 s*code stream 400 Kbits/8, where the dividing by 8 is performed due to the fact that the unit of capacity of the memory buffer is byte and the unit of the product result is bit, 1 byte=8 bits. The value of the disc buffer is 1 GB (which is an empirical value selected according to the value of the average residual disc space of a large amount of users). Because the live video code stream is 400 Kbits, the disc buffer can store the live video packets for about 1000000*8/400/3600=5.5 h.

When receiving the live video packets, the client puts the live video packets into the memory buffer of the client and at the same time writes the live video packets into the disc buffer. Both the memory buffer and the disc buffer of the client adopt the principle of FIFO. When the live video packets are written into the disc buffer, a naming rule as the same as that in which the live server stores the live video data is used, and a sequence number is added at the end of each of the live video packets, for example, a first live video packet of the CCTV1 which begins from 18:00, Dec. 2, 2009 is name as CCTV1T2009120218000001, and a second live video packet is named as CCTV1T2009120218000002 and the like. Wherein the CCTV1T2009120218 is identical to the name of the live video file stored by the live server every 60 minutes, and the 000001, 000002 following that are sequence numbers in time sequence.

After each of the live video packets is written into the disc buffer, the client adds a record in the comparison table for recording the channel information, the time information of the live video packet and storage information of the live video packet in the disc buffer.

Considering the security of the live video packets, each of the live video files in the client should be verified, and the verification result is stored in the live video file. When another client receives the live video data file from the client to use if a calculated verification result is the same as the verification result in the live video file. If the verification results are different from each other, it indicates that the live video data is damaged or modified, and the live video file is therefore discarded. Such operation is performed for ensuring the live video file not to be modified and guaranteeing the security of the live video data transmission.

After the live video data file is written into the disc buffer, the client immediately submits the storage situation to the control server.

When the client stops viewing the live video, the client interrupts all data transmission links for the live video packets, removes the live video packets in the memory buffer of the client and deletes the comparison table.

(2) The control server calculates a difference between the current time and the start time of displaying the live video requested by the client. If the start time of displaying the requested live video is earlier than the current time and later than a time which is obtained by subtracting the value of the time length of the memory buffer of the live server (60 minutes) from the current time, for example, the start time of displaying the live video requested by the client is 17:01:45, Dec. 11, 2009, the current time is 17:25:40, Dec. 11, 2009, the time obtained by subtracting the value of the time length of the memory buffer of the live server from current time is 16:25:40, Dec. 11, 2009, and therefore, the start time of displaying the live video requested by the client 17:01:45, Dec. 11, 2009 is earlier than the current time and later than the time, 16:25:40, Dec. 11, 2009, obtained by subtracting the value of the time length of the memory buffer of the live server from the current time. The control server determines that the request is a live time-shift video request within the range of the memory buffer of the live server. The live video packets requested by the client exist in the memory buffer of the live server and other client terminals currently viewing the same channel stores the live video packets. The control server queries the live information list, and then sends to the client connection information of the live server that is live-broadcasting the channel currently and other clients currently viewing the live channel. The client establishes data links between itself and the above server as well as between itself and other clients and obtains live time-shift video packets with a shift time less than 60 minutes.

When viewing the live time-shift video with a time shift less than 60 minutes, the client establishes a memory buffer, a disc buffer and a comparison table. The value of the time length of the memory buffer of the client is 150 s, and the value of the disc buffer of the client is 1 Gbyte. When receiving the live video packets, the client puts the live video packets into the memory buffer of the client while writing the live video packets into the disc buffer. Both the memory buffer and the disc buffer of the client adopt the principle of FIFO.

(For the live server, the live video data requested by the client is stored in the memory buffer of the live server and just the start time of the video is shifted, thus the live server only needs to find the start position of the live video packet of a corresponding time point in the memory buffer of the live server, and then sends the live video packet stream in time sequence.

For other clients currently viewing the live video content and having stored the comparison table for the live video storage, the other clients find the storage position of the corresponding live video packet file in the comparison table and then transmit the live video packets in time sequence.)

When receiving the live video packets transmitted from the live server and other clients, the client stores the received live video packets into the disc buffer sequentially in a naming rule for the file: channel information+original time before time-shift as time information+packet sequence number. For example, the current time is 18:30:00, Dec. 20, 2009, and the client is currently viewing the live time-shift video content of 18:00:00, Dec. 20, 2009, thus the time shift is 30 minutes. The live video packets are named according to the time before time-shift, for example, the first packet file is named as CCTV1T2009122018000001.

After each of the live video packets currently viewed by the client is written into the disc buffer, the client adds a record in the comparison table for recording the channel information, the time information of each of the live video packets and storage information of each of the live video packets in the disc buffer.

(Considering the security of the live video packets) Each of the live video files in the client should be verified, and the verification result is stored in the live video file. When another client receives a live video data file from the client, the live video data file may be used if a calculated verification result is the same as the verification result in the live video file. If the verification results are different from each other (it indicates that the live video data is damaged or modified), the live video file is therefore discarded (such operation is performed for ensuring the live video file not to be modified and guaranteeing the security of the live video data transmission).

After the live video data file is written into the disc buffer, the client immediately submits the storage situation to the control server. When the client stops viewing the live video, the client interrupts all data transmission links for the live video packets, removes the live video packets in the memory buffer of the client and deletes the comparison table.

(3) The control server calculates a difference between the current time and the start time of displaying the live video requested by the client. If the start time of displaying the requested live video is earlier than a time which is obtained by subtracting the value of the time length of the memory buffer of the live server (60 minutes) from the current time, for example, the start time of displaying the live video requested by the user is 17:30:45, Dec. 10, 2009, the current time is 17:25:40, Dec. 11, 2009, the time obtained by subtracting the value of the time length of the memory buffer of the live server (60 minutes) from the current time is 16:25:40, Dec. 11, 2009, thus the start time of displaying the live video requested by the user 17:30:45, Dec. 10, 2009 is earlier than the time obtained by subtracting the value of the time length of the memory buffer of the live server (60 minutes) from the current time 16:25:40, Dec. 11, 2009, the control server determines that the request is a live time-shift video request out of the range of the memory buffer of the live server. The live video packets requested by the client only exist in the disc storage area of the live server and the disc buffer of other client terminals which have stored the live video files. The control server queries the live time-shift information list, and then sends to the client connection information of the live server that has stored the live video files and other clients, the client establishes data links between itself and the above server as well as between itself and other clients and obtains the live time-shift video packets with a shift time longer than 60 minutes.

When viewing the live time-shift video with the time shift longer than 60 minutes, the client establishes a memory buffer, a disc buffer (but there is no need to establish a comparison table). The value of the time length of the memory buffer of the client is 150 s, and the value of capacity of the disc buffer is 1 GB. When receiving the live video packets, the client puts the live video packets into the memory buffer of the client while writing the live video packets into the disc buffer. Both the memory buffer and the disc buffer of the client adopt the principle of FIFO.

(For the live server, the live video data requested by the client is stored in the storage space, and thus the live server finds the file including the live time-shift video packets by comparing the channel information and the time information of the live time-shift video with the file name, and then transmits the file to the client in time sequence.

Other clients have stored live time-shift video packets. The Other clients find a live time-shift video packet file by comparing the channel information and the time information of the live time-shift video with the file name in the disc buffer, and then transmit the file to the client in time sequence.)

When receiving the live video packets transmitted from the live server and other clients, the client stores the received live video packets into the disc buffer sequentially in a naming rule for the file: channel information+original time before time-shift as time information+packet sequence number, for example, the current time is 18:00:00, Dec. 20, 2009, and the client is viewing the live time-shift video content of 18:00:00, Dec. 19, 2009 currently, thus the time shift is 24 hours. The live video packets are named according to the time before time-shift, for example, the first packet file is named as CCTV1T2009121918000001.

(Considering the security of the live video packets) Each of the live video files in the client should be verified, and the verification result is stored in the live video file. When another client receives a live video data file from the client, the live video data file may be used if a calculated verification result is the same as the verification result in the live video file. If the verification results are different from each other (it indicates that the live video data is damaged or modified), the live video file is discarded (such operation is performed for ensuring the live video file not to be modified and guaranteeing the security of the live video data transmission).

After the live video data file is written into the disc buffer, the client submits the storage situation to the control server.

When the client stops viewing the live video, the client interrupts all data transmission links for the live video packets and removes the live video packets in the memory buffer of the client.

The method described in (3) is much similar to the P2P on-demand technology. However, in the present invention what the client views is a temporal live video stream which is obtained by time-shifting the live video, which is the basic difference between the present invention and the P2P on-demand technology.

The invention claimed is:

1. A live time-shift method based on the P2P technology, comprising:
   1) receiving, by a coding server at a server end, a live video data stream from a live video data source, first splitting the live video data stream into fixed-size live video packets, and then adding live channel information and time information to each of the live video packets;
   issuing, by the coding server, the coded live video packets to a live server, and sending to a control server the live channel that is being currently coded, the live server currently receiving the live video packets and control information of coding restart or coding failure;
   2) establishing a memory buffer in the live server at the server end, and setting the memory buffer at the server end to have a size capable of storing fixed-time length live video packets; continuously obtaining, by the live server, the live video packets from the coding server, and writing the live video packets into the memory buffer at the server end; when the memory buffer of the live server is full, the earliest live video packet being discarded, and the memory buffer that has been vacated being adapted to receive the latest live video packet;
   establishing a disc storage space in the live server; writing, by the live server, the live video packets in the memory buffer at the server end into the disc storage space at a specified time interval; and before writing the live video packets into the disc buffer, removing the live channel information and the time information of each of the individual live video packets, combining all the live video packets written in the disc storage space in one time interval into a live video data file; setting the channel information and the time information of the live video data file as a file name of the video data file, and submitting the channel information and the time information of the video data file to the control server; wherein the channel information and the time information is unique identification information for the video data file;
   providing, by the live server, a P2P live service using the live video packets in the memory buffer, or providing a live time-shift service within the range of time length of the memory buffer of the live server using the live video packets in the memory buffer at the server end, or providing a live time-shift service with a time length exceeds that of the memory buffer of the live server using the live video content stored in the disc storage space;
   3) when a client requests viewing of the video data, first sending, by the client, a video request to the control server at the server end, the video request comprising channel information and time information; returning, by the control server, storage information of the video data to the client according to the start time of the video requested by the client and the size of the memory buffer of the live server; establishing, by the client, a data link between the client and the live server or other clients according to the storage information; and obtaining the video data through the established data link.

2. The method according to claim 1, wherein, in the step 3), the process of returning, by the control server, the storage information of the video data to the client according to the start time of the video requested by the client and the size of the memory buffer in the live server, establishing, by the client, data links with the live server or other clients according to the storage information, and obtaining the video data through the established data link comprises the following three situations:
   situation (1): The start time of displaying the live video requested by the client is a current time:
   the control server first calculates a difference between the current time and the start time of the live video requested by the client; if the difference is 0, the request from the client is a live video request; the control server queries the live information list and sends to the client a list of the live server currently issuing the live channel and address information of other clients currently viewing the live channel; the client establishes a data link between the client and the live server as well as between the client and other clients currently receiving the live video packets in the list for receiving the live video packets;
   a memory buffer, a disc buffer and a comparison table are established in the client; when receiving the live video packets, the client puts the live video packets into the memory buffer of the client while writing the live video packets into the disc buffer; after each of the live video packets is written into the disc buffer, the client adds a record in the comparison table for recording the channel information, the time information of the live video packet and storage information of the live video packet in the disc buffer;
   the client writes the live video packets into the disc buffer in a naming rule as the same as that in which the live server stores the live video data and a sequence number is added at the end of each of the live video packets; when the live video packets are written into the disc buffer, the client verifies each of the live video files, and a verification result is put behind the live video file; when another client receives the live video data file from the client, the live video file is discarded if a verification result is different from that of the live video file;

the client submits to the control server the storage situation after the live video data file is written into the disc buffer;

when the client stops viewing the live video, the client interrupts all data transmission links for the live video packets, removes the live video packets in the memory buffer of the client and deletes the comparison table;

situation (2) the start time of displaying the live video requested by the client is earlier than the current time and later than a time which is obtained by subtracting the value of the time length of the memory buffer of the live server from the current time:

the control server first calculates a difference between the current time and the start time of displaying the live video requested by the client; if the start time of displaying the requested live video is earlier than the current time and later than a time which is obtained by subtracting the value of the time length of the memory buffer of the live server from current time, the control server determines that the request is a live time-shift video request within the range of the memory buffer of the live server; the live video packets requested by the client exist in the memory buffer of the live server, and other client terminals currently viewing the same channel stores the live video packets; the control server queries the live information list, and then sends to the client connection information of the live server currently live-broadcasting the channel and other clients currently viewing the live channel; the client establishes a data link between the client and the live server as well as between the client and other clients, and obtains live time-shift video packets with a shift time shorter than the value of the time length of the memory buffer of the live server;

when viewing the live time-shift video with a shift time shorter than the value of the time length of the memory buffer of the live server, the client establishes a memory buffer, a disc buffer and a comparison table, and implements file storage, file verification and report of stored information as the client in situation (1);

situation (3) the start time of displaying the live video requested by the client is earlier than a time which is obtained by subtracting the value of the memory buffer of the live server from the current time:

the control server calculates a difference between the current time and the start time of displaying the live video requested by the client; if the start time of displaying the requested live video is earlier than a time which is obtained by subtracting the value of the time length of the memory buffer of the live server from the current time, the control server determines that the request is a live time-shift video request out of the range of the memory buffer of the live server; the live video packets requested by the client only exist in the disc storage area of the live server and the disc buffer of other client terminals that have stored the live video files; the control server queries the live time-shift information list, and then sends to the client connection information of the live server that has stored the live video files and other clients; the client establishes a data links between the client and the above server as well as between the client and other clients, and obtains the live time-shift video packets with a shift time longer than 60 minutes;

when viewing the live time-shift video with a shift time longer than 60 minutes, the client establishes a memory buffer and a disc buffer; the operation principle of the memory buffer and the disc buffer of the client is the same as that of the client described in situation (1), with the exception that the shift time of the live time-shift video viewed by the client is longer than the value of the time length of the memory buffer of the live server and that the live video data is transmitted in a manner of live video file; during viewing of the live time-shift video, the client implements file storage, file verification and report of stored information as the client in situation (1); the client downloads the corresponding live video file in a manner of file and stores the live video files into the disc buffer while displaying the live video file; when the client stops viewing the live time-shift video, the client submits the storage information to the control server.

* * * * *